United States Patent
Gubbi

(10) Patent No.: US 6,434,113 B1
(45) Date of Patent: Aug. 13, 2002

(54) DYNAMIC NETWORK MASTER HANDOVER SCHEME FOR WIRELESS COMPUTER NETWORKS

(75) Inventor: Rajugopal R. Gubbi, Fair Oaks, CA (US)

(73) Assignee: Sharewave, Inc., El Dorado Hills, CA (US)

( * ) Notice: Subject to any disclaimer, the term of this patent is extended or adjusted under 35 U.S.C. 154(b) by 0 days.

(21) Appl. No.: 09/288,947

(22) Filed: Apr. 9, 1999

(51) Int. Cl.$^7$ ............................................. G01R 31/08
(52) U.S. Cl. ...................... 370/216; 370/254; 370/338; 370/457
(58) Field of Search ................................ 370/216, 218, 370/219, 241, 242, 245, 276, 277, 338, 480, 457, 254, 255; 709/208, 209

(56) References Cited

U.S. PATENT DOCUMENTS

| | | | | |
|---|---|---|---|---|
| 5,551,066 A | * | 8/1996 | Stillman et al. | 455/69 |
| 5,691,980 A | * | 11/1997 | Welles, II et al. | 370/316 |
| 5,787,355 A | * | 7/1998 | Bannister et al. | 455/458 |
| 5,862,142 A | * | 1/1999 | Takiyasu et al. | 370/480 |
| 6,031,863 A | * | 2/2000 | Jusa et al. | 375/202 |
| 6,034,621 A | * | 3/2000 | Kaufman | 340/825.44 |

FOREIGN PATENT DOCUMENTS

EP 0899920 A2 8/1998
WO WO 94/29986 12/1994

OTHER PUBLICATIONS

PCT, International Search Report, PCT/US 00/07079, Sep. 11, 2000.

\* cited by examiner

Primary Examiner—Chau Nguyen
Assistant Examiner—Soon-Dong Hyun
(74) Attorney, Agent, or Firm—Blakely Sokoloff Taylor & Zafman LLP

(57) ABSTRACT

A network node is configured control operations in a wireless computer network and to automatically hand over network master operations to an alternate network master device upon detecting an operational failure of the network node. In a further embodiment, in response to detecting at a network node of a wireless computer network an impending operational failure of the network node, the node automatically negotiates the hand over of network control responsibilities for the wireless computer network to an alternate network master. Such network control responsibilities may include bandwidth allocation among network clients within the wireless computer network. In still another embodiment, in response to detecting at a node of a wireless computer network (e.g., utilizing a half-duplex communication link) the absence of a master network node, the node will automatically configure itself as an alternate network master. This process may include negotiating with other master-capable nodes of the network for control of the network. Further, the node may search for an absent master node before assuming control of the network.

4 Claims, 3 Drawing Sheets

DYNAMIC NETWORK MASTER HANDOVER SCHEME FOR WIRELESS COMPUTER NETWORKS

RELATED APPLICATION

This application is related to a co-pending application, Ser. No. 09/151,746, entitled Dynamic Communication Channel Switching for Computer Networks, filed Sep. 11, 1998, and assigned to the Assignee of the present invention.

FIELD OF THE INVENTION

The present invention relates generally to a scheme for communications within a computer network and, in particular, to the continued provision of network services after the failure of a master node within the network.

BACKGROUND

In the above-referenced co-pending application, Ser. No. 09/151,746, which is incorporated herein by reference, a computer network adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used. Preferably, the communication channel is supported on a wireless communication link.

The generalization of this network structure is shown in FIG. 1. A subnet 10 includes a server 12. In this scheme, the term "subnet" is used describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14 (half-or full-duplex), which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 22, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infra-red links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

Server 12 is an example of a network "master device". A master device is defined as the device in the subnet having complete control of the network operation with responsibilities such as client authentication, bandwidth allocation, and timing synchronization. Moreover as described in the above-mentioned co-pending application, master devices need to be able to respond to requests by clients to join a subnet. For example, when there are no online clients, the master node should be configured to park in a free channel and remain in a receive mode until a client packet is detected. New clients seeking admission to a network may then try to wake up the master node by sending connection request transmissions. If the master device does not respond within a predetermined time, then the client may change channels and try again. Using this mechanism, the client searches for the master device in all the channels for a predetermined number of times. If the master device is not found, then user will be informed of the same. If the master device does respond, then the client falls in synchronization with the master to continue the communication.

These schemes have the advantage of providing low interference or a free channel when the subnet is not operating. If the master node were kept active all the time (for example, by transmitting synchronization information over an active channel) any other neighborhood subnets may experience unneeded interference. However, problems with this methodology exist. For example, if no active master network device is available, a user will be unable to connect to a subnet. Further, if the master device malfunctions during network operations, an entire subnet may be brought down. It would be desirable to avoid such situations.

SUMMARY OF THE INVENTION

In one embodiment, a network node is configured control operations in a wireless computer network and to automatically hand over network master operations to an alternate network master device upon detecting an operational failure of the network node.

In a further embodiment, in response to detecting at a network node of a wireless computer network an impending operational failure of the network node, the node automatically negotiates the hand over of network control responsibilities for the wireless computer network to an alternate network master. Such network control responsibilities may include bandwidth allocation among network clients within the wireless computer network.

In still another embodiment, in response to detecting at a node of a wireless computer network (e.g., utilizing a half-duplex communication link) the absence of a master network node, the node will automatically configure itself as an alternate network master. This process may include negotiating with other master-capable nodes of the network for control of the network. Further, the node may search for an absent master node before assuming control of the network.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which.

DETAILED DESCRIPTION

Described herein are schemes for providing dynamic network master handover capabilities within a computer network communicatively coupled by one or more wireless communication links. However, although these schemes are discussed with reference to certain embodiments illustrated in the above-mentioned drawings, it should be recognized (and, indeed, upon review of this discussion those of ordinary skill in the art will realize) that the methods and apparatus discussed herein are merely examples of the broader concepts involved with the present invention. For example, in any computer network based on master-client relations, it is very important to consider the factors that can lead to the failure of a master device. In the absence of the master device, the rest of the network may be rendered inoperative. Thus in the present architecture, a protocol devised to hand over the responsibilities of the master device to an alternate master device is implemented. This protocol may well find application beyond the examples presented herein.

In general, there are three scenarios in which another network node may replace a current master device. First, situations may arise in which the original master device detects failures within itself. In this scenario, the master device is configured to search for and wake up an available alternate master device in the network, and hand over the network master responsibilities.

Second, an alternate master device may detect that the original network master device has gone absent. Here, the alternate master device will attempt to establish a connection with the original master device by searching for it in all the available channels. If the search fails to locate the original master device, the alternate master device then instructs the remaining network components (including any other alternate master devices) that it is taking over the responsibility of the master device. The protocol accounts for and provides solutions to situations where multiple alternate master devices try to assume responsibility, through negotiations among these alternate master devices before the take over.

Third, where an alternate master device has taken over the network operations, situations may arise when the original master device returns. Alternatively, the original master device may never have experienced any failure and the alternate master device may have started operating as a network master without permission. In such cases, the original master device should be configured to instruct the currently operating master device to hand over these responsibilities.

Figure 1:
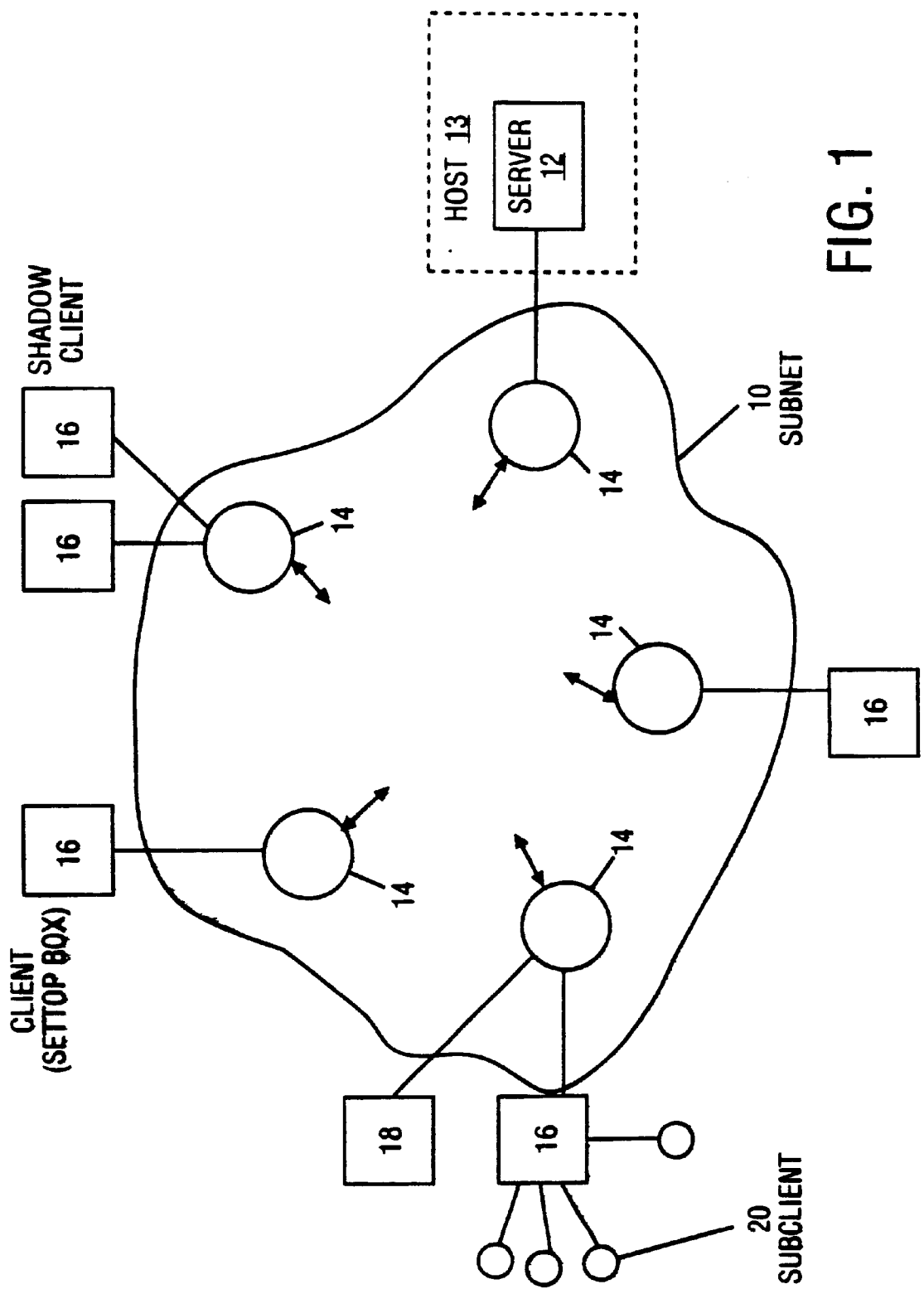
FIG. 1 illustrates a generalized network structure that is supported by a wireless communication protocol.
Figure 2:
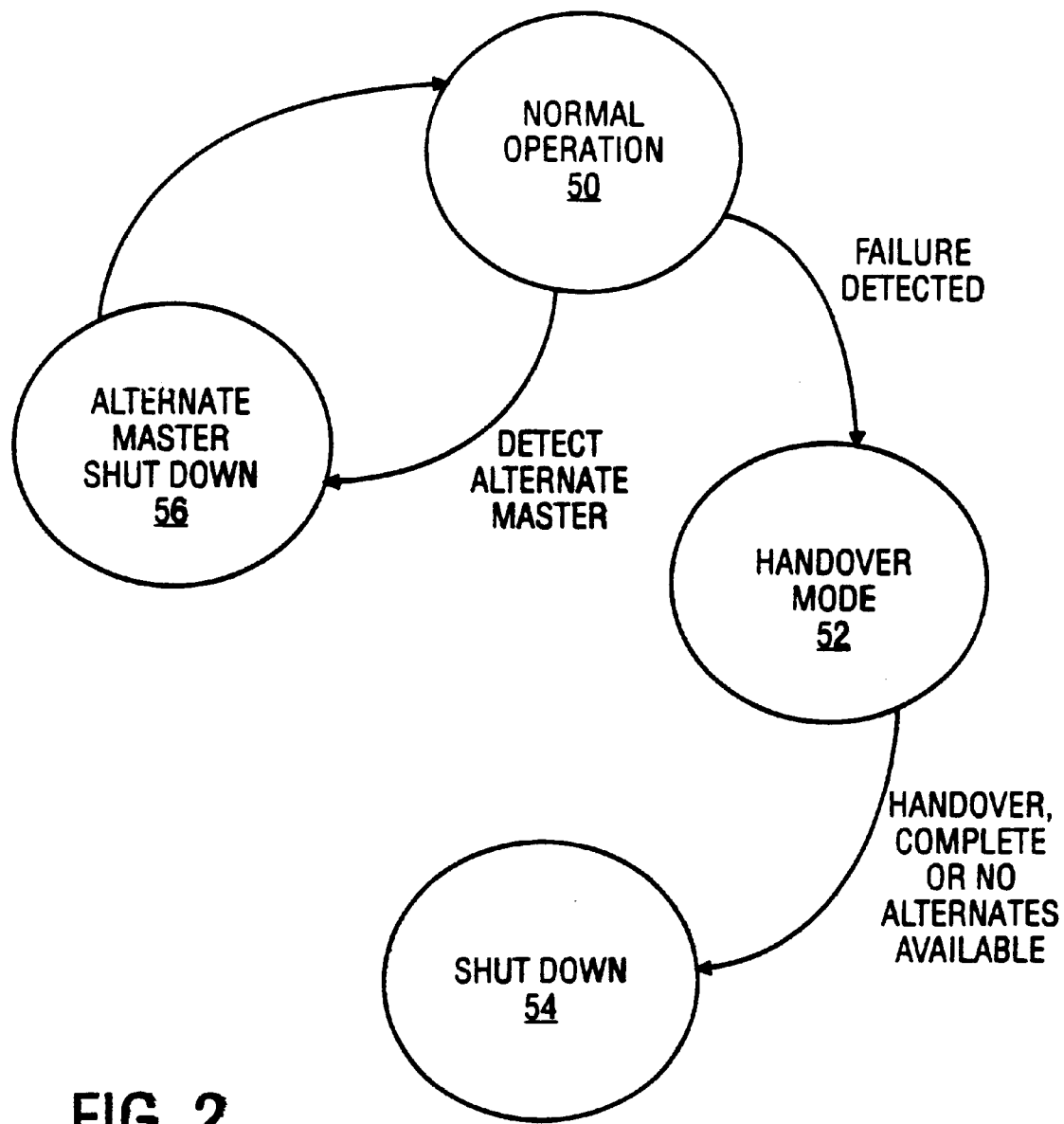
FIG. 2 is a state diagram illustrating operating modes for a network master device configured in accordance with one embodiment of the present invention.
Figure 3:
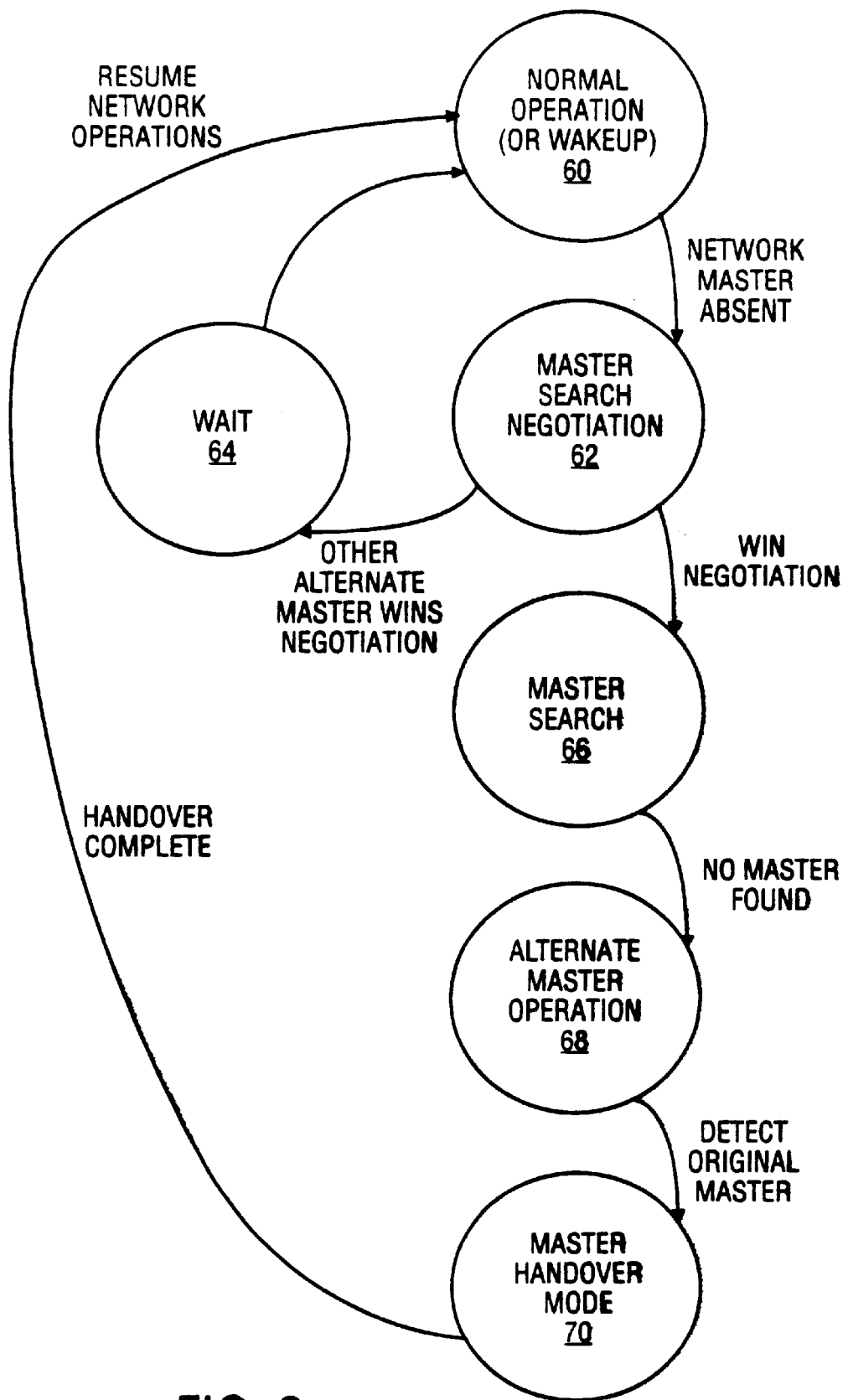
FIG. 3 is a state diagram illustrating operating modes for an alternate network master device configured in accordance with one embodiment of the present invention.

These operations are illustrated in the state diagrams shown in FIGS. 2 and 3. First, the operation of a device that usually functions as a network master is shown in FIG. 2. During normal operations (state 50), the master device performs the ordinary network control operations discussed in detail in the above-cited co-pending application. Briefly, these operations may include controlling communications to and from the clients 16 within subnet 10, including negotiating bandwidth requirements with these clients. Further, channel switching operations and other control functions are carried out in this mode.

Upon detecting an internal failure (or that a failure is about to occur), the network master enters a handover mode 52. In this mode, the master device searches a client list for any alternate master devices. The client list may be configured as a table of network clients (and subclients, shadow clients, etc., if any) that includes properties of the client nodes, their bandwidth requirements, etc. Such a table is generated and maintained as the network is operated, as described in the co-pending application mentioned above. Preferably, the network master enters a note in the table to indicate those clients that are capable of operating as network masters. Such nodes may be configured to identify themselves as alternate master capable devices upon joining the subnet 10. For example, the information may be included within one or more packets exchanged between the alternate master device and the master device at the time the alternate master device joins the subnet as a client.

Upon locating the next alternate master device in the table, or in accordance with a predetermined priority scheme for handing over network control responsibilities, the network master device begins a negotiation with the alternate master to hand over network control. Within this negotiation, the network master may pass the alternate master a current client list, thus advising the alternate master of existing conditions (e.g., bandwidth allocations, etc.) within the network. Upon completion of the handover process (or in the event no alternate master is available), the network master device shuts down (state 54).

Sometimes during normal operation, or when recovering from a prior failure, the network master device may detect the presence of an alternate master device that has started operating as a network master. Such an indication may register as an attempt by the alternate master to change bandwidth allocations within the subnet 10., etc. At such times, the network master enters a mode (56) wherein it transmits instructions to the alternate master device to cease network master operations. Upon successful completion of this operation, the network master may return to normal operations, which may require reinitializing the network if such operations were adversely interrupted by the acts of the alternate master device.

Turning now to FIG. 3, the operational modes of an device that is capable of acting as a alternate network master are illustrated. In normal operation (state 60), the device operates as a network client as described in the above-cited co-pending application. During these operations, or where the device has just been activated, the absence of a network master may be detected. In such cases, the device enters a master search negotiation mode (state 62) wherein it communicates with other alternate master devices within the network to determine which device will attempt to find the master. If another alternate master device wins the negotiation (e.g., by indicating it has superior processing bandwidth, available memory, total memory, existing connections to other PCs, or outside networks, etc.) the device enters a wait state 64. Note, if all alternate master devices have roughly the same capabilities, than a negotiation winner may be chosen based on random number selection among these devices.

Otherwise, where no other alternate master devices are operating or when this device wins the negotiation, it enters a master search mode 66. In this mode, the alternate master searches for the missing network master, for example by transmitting connection requests at various intervals over the available communication channels. If the network master responds, normal network operations are resumed.

Where no response is received, however, the alternate master begins operating as the network master (state 68). As such, the alternate master may be required to reinitiate contact with each of the network clients 16 and negotiate bandwidth allocations, etc. in doing so, this alternate master may build its own client table and keep track of other alternate master devices within the subnet.

If at any time subsequent to taking over the responsibilities of network master, the alternate master detects the return of the original network master, the alternate master will enter a master handover mode 70. In this mode, the alternate master will transfer control of the network to the original master (e.g., in a fashion similar to that when an original master transfers control upon detecting an internal failure). Once control has been so transferred, the alternate master resumes operations as a network client.

Thus, a scheme for providing dynamic network master handover capabilities within a computer network has been described. Although discussed with reference to certain illustrated embodiments, the present invention should not be limited thereby. Instead, the present invention should only be measured in terms of the claims that follow.

What is claimed is:

1. A method comprising:

transmitting one or more connection requests from a first node on a network to one or more other nodes on the network;

receiving no response from an original network master device;

causing the first node to enter a master search negotiation mode, wherein the first node communicates with the one or more other nodes on the network to determine which device will attempt to locate the network master device;

designating the first node or other node as a master search device, wherein the designated master search device searches for the silent original network master device by transmitting one or more connection requests at various intervals over one or more available communications channels; and reverting the node acting as the master search device to normal network operations if a response is received from the original network master device.

2. The method of claim 1, further comprising:

otherwise designating the node acting as the master search device as a substitute network master device until such time as operation of the original network master device is detected.

3. The method of claim 2, further comprising:

causing the substitute network master device to enter a master handover mode upon said detection of operation of the original network master device.

4. The method of claim 3, further comprising:

receiving a command from the original network master device instructing the substitute network master device to cease network master operations;

automatically transferring control of network operations from the node acting as the substitute network master client to the original master device upon receipt of said command; and causing said node to resume operations as a network client upon successful handover of control to the original network master device.

* * * * *